United States Patent [19]
Ledger

[11] Patent Number: 5,452,953
[45] Date of Patent: Sep. 26, 1995

[54] FILM THICKNESS MEASUREMENT OF STRUCTURES CONTAINING A SCATTERING SURFACE

[75] Inventor: Anthony M. Ledger, New Fairfield, Conn.

[73] Assignee: Hughes Aircraft Company, Los Angeles, Calif.

[21] Appl. No.: 134,728

[22] Filed: Oct. 12, 1993

[51] Int. Cl.$^6$ .................................... G01B 11/06
[52] U.S. Cl. .................. 356/382; 356/355; 356/357; 250/341.1
[58] Field of Search .................. 356/381, 382, 356/355, 357, 360, 359; 250/339.11, 341, 341.1

[56] References Cited

U.S. PATENT DOCUMENTS

| | | | |
|---|---|---|---|
| 3,631,526 | 12/1971 | Brunton | 250/341 |
| 3,693,025 | 9/1972 | Brunton | 356/382 |
| 3,870,884 | 3/1975 | Williams | 250/339.11 |
| 4,254,337 | 3/1981 | Yasujima et al. | 356/357 |
| 5,293,214 | 3/1994 | Ledger | 356/355 |

FOREIGN PATENT DOCUMENTS

| | | | |
|---|---|---|---|
| 0115704 | 4/1990 | Japan | 356/382 |
| 5113319 | 5/1993 | Japan | 356/381 |

*Primary Examiner*—Hoa Q. Pham
*Attorney, Agent, or Firm*—W. C. Schubert; W. K. Denson-Low; M. W. Sales

[57] ABSTRACT

Systems for making thickness measurements in a thin film structure using an incoherently or coherently coupled structured surface. A system is used to measure the thickness of a thin film layer of a thin film structure in which polished and structured surfaces are coherently coupled together. Visible light used to measure the thickness of thin bonded wafers that have a ground upper surface, or infrared light is used to measure the thickness of thick silicon wafers where one surface is ground, and the other is polished. Other systems use a structured surface that is incoherently coupled to a thin film structure in order to illuminate the thin film structure at many angles. The systems produce interference fringes that are detected and recorded, and multispectral pattern matching is used in a computer to compute film thickness based on scattering characteristics included in a library f stored interference patterns.

21 Claims, 2 Drawing Sheets

FILM THICKNESS MEASUREMENT OF STRUCTURES CONTAINING A SCATTERING SURFACE

BACKGROUND

The present invention relates generally to film thickness measurement systems, and more particularly, to film thickness measurement systems for use with structures containing a scattering surface.

In the fabrication of simple silicon wafers and bonded silicon wafers, there is a requirement to measure layer thicknesses at an early stage during manufacture when only one side of the wafer is polished, in the case of a single wafer, or when the top surface of a bonded wafer is mechanically polished to a level where plasma polishing can start. Bonded silicon wafers may be measured using the visible region of the optical spectrum since the silicon layers are thin, whereas thick single wafers must be measured using the infrared region of the optical spectrum due to high light absorption levels at visible wavelengths.

If a thin film silicon wafer is illuminated with narrow band radiation, optical fringes are formed across the aperture, although they have reduced finesse or contrast due to averaging effects introduced by an exposed scattering surface (the top, fine ground scattering surface). The coupling between the structured layer and the remaining thin films is usually coherent in this case since film thicknesses are less than the coherence length of the light source. A thickness measurement may be made under these circumstances if a library used for pattern matching includes the effects of the scattering or surface structure details. In the simplest case of a ground surface that forms the outer or scattering surface, a model may be created based upon the random film thicknesses caused by the grinding process and the large range of angles, and hence optical path differences that occur in the layer.

Typically, scatterplates and scattering surfaces have been used in conventional interferometric and holographic measurements of mirror or object surfaces. However, these conventional approaches measure the surface profile of the mirror and not the thickness of a thin film disposed on the surface of the mirror. Prior art exists for the case where structured surfaces consisting of diffraction gratings are buried inside or placed on top of multilayer coatings. These devices have been used as dichroic reflecting beamsplitters and beam sampling optical elements in high energy laser systems. However, there is no prior art regarding the use of scattering surfaces that are coherently coupled to a thin film structure to measure partially finished wafers, or the use of a scattering surface as a beamsplitter (incoherent coupling) to allow multispectral imaging of large wavy reflecting surfaces.

Thickness measurements of thin films on silicon, including bonded silicon-on-insulator (SOI) wafers comprising planar films are currently measured by recording full aperture fringe patterns at numerous wavelengths and deriving the spectral characteristics of the film over the entire wafer. This data is then pattern-matched against a precomputed library to determine the best fit spectrum, and hence the film thickness of one of the layers. In this case, the library models the reflectance spectral patterns of plane parallel, homogeneous layers as found in conventional thin film structures.

Therefore it is an objective of the present invention to provide for film thickness measurement systems for use with structures containing a scattering surface. It is also an objective of the present invention to provide for film thickness measurement systems that use scattering surfaces that are coherently coupled to a thin film structure to measure partially finished wafers, and use a scattering surface as a beamsplitter (incoherent coupling) to allow multispectral imaging of large wavy reflecting surfaces.

SUMMARY OF THE INVENTION

In order to meet the above and other objectives, the present invention comprises systems for making thickness measurements in a thin film structure when a structured surface, such as a ground glass screen, fly's eye array, lenslet arrays, binary optical elements, or diffractive pattern, is incoherently or coherently coupled to the thin film structure. A first system is used to measure the thickness of a layer in a structure in which polished and structured surfaces are coherently coupled together. Visible light is used to measure the thickness of thin bonded wafers that have a ground upper surface, or infrared light is used to measure the thickness of thick silicon wafers where one surface is ground, and the other is polished. A second system uses a structured surface that is incoherently coupled to a film structure in order to illuminate the film at many angles. Both systems produce interference fringes that are recorded using a recording device, such as a television camera, and multispectral pattern matching is used to compute film thickness using scattering characteristics included in a library of stored interference patterns.

More particularly, if the top surface of a layer of a thin film structure is finely ground or configured into a scattering surface, by forming an optically structured surface using fly's eye features, lenslet arrays, binary optical elements, or diffractive patterns, and the like, then interference fringe formation using monochromatic light is employed using a receiving detector system (camera) having a narrow field of view (to provide for angular filtering). If this thin film structure is illuminated at many narrow band wavelengths, then a series of reduced amplitude fringe patterns are observed by the camera which are used to compute the unknown thickness of the layer of the thin film structure by using a pattern matching library that includes a model of scattering effects. This allows thickness measurements of bonded wafers to be performed without having to polish the top surface of the wafer. This technique may also be employed using infrared radiation to measure thick silicon wafers wherein one side of the wafer is polished, and the other side of the wafer is ground. This measurement technique makes it possible to measure wafers earlier in their manufacturing process.

In addition, if a finely ground or optically structured surface is placed in close proximity to a bonded or coated wafer and the structured surface and wafer are illuminated by monochromatic light or band-limited light, then interference fringes of reduced amplitude are formed. In this case the coupling due to the structured surface is typically incoherent, and film thickness is still determined by pattern matching using the appropriate model in the library. The structured surface acts as a scatterplate beamsplitter and a filtered light source is used to illuminate the wafer and structured surface at a large number of angles from an off-axis position, and a conventional camera is used to view thin film fringes from a second off-axis position. The illumination system may be made using plastic optics and the imaging lens may be an inexpensive TV camera lens, resulting in an inexpensive measuring system.

Specifically the present invention is a film thickness measuring system for measuring the thickness of a thin film structure. The system comprises a spectrally filtered light source for illuminating the thin film structure to produce a reflectively scattered beam therefrom. A detector system is provided for detecting the reflectively scattered beam and providing an output signal corresponding thereto. A computer is coupled to the detector system that comprises a plurality of library models corresponding to scattering patterns from the reflectively scattered beam, and that correspond to respective thicknesses of the thin film structure. The detector system typically includes a detector (a single detector and amplifier, a linear array and amplifier array, or a CCD array and frame grabber) for detecting the reflectively scattered beam and providing an output signal corresponding thereto, and a frame grabber coupled to the detector for capturing the output signal produced by the detector. The thin film structure may comprise a multilayer thin film structure comprising a wafer that includes a substrate, a first thin film layer, and an outer thin film layer that has a ground outer surface that forms a coherent structured outer surface of the wafer. The thin film structure may comprise a partially polished thin film structure, and the film thickness measuring system further comprises a structured surface disposed between the thin film structure and the spectrally filtered light source, and disposed adjacent to the thin film structure at a distance greater than the coherence length (L) for the radiation provided by the spectrally filtered light source. The thin film structure may comprise a bonded or coated wafer.

The present measurement systems allow thickness determinations on single and bonded wafers in the early stages of manufacture, and the development of inexpensive instrumentation for obtaining full wafer maps of thin films on silicon wafers. The latter technique applies to planar, bonded, multilayer and patterned wafers.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
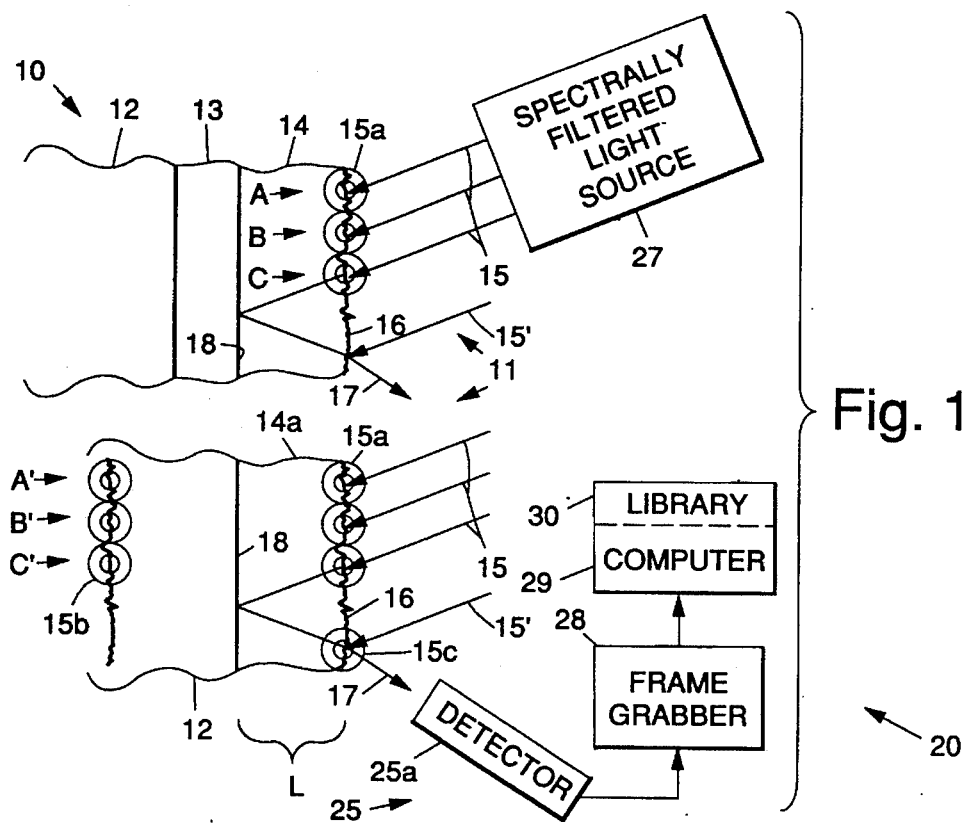
FIG. 1 shows a thickness measuring system in accordance with the principles of the present invention for measuring the thickness of a thin film structure having a coherently coupled outer surface.

Referring to the drawing figures, FIG. 1 shows a thickness measuring system 20 in accordance with the principles of the present invention for measuring the thickness of a thin film structure 11 having a structured outer surface 16. More particularly, FIG. 1 shows a portion of a two layer thin film structure 11 comprising a wafer 10 that includes a substrate 12, a first thin film layer 13, and an outer thin film layer 14. The outer layer 14 has a ground outer or exposed surface 16 that forms a coherent structured outer surface 16 of the wafer 10. As shown in the bottom portion of FIG. 1, the top two specular layers of the wafer 10, comprising the first and outer thin film layers 13, 14, are combined to form a combined reflecting layer 14a as is routinely done when analyzing thin film multilayer structures such as the wafer 10.

Collimated radiation 15 derived from a spectrally filtered light source 27 is made incident at an arbitrary angle onto the exposed surface 16 of the wafer 10, and exposed surface 16 of the outer thin film layer 14 forms a scattering surface that may be thought of as generating a series spherical scattered waves 15a (identified as points A,B,C) from the ground outer surface 16. However, the series spherical scattered waves 15a appear to emanate from a series of virtual point sources (identified as points A', B', C') located behind the combined reflecting layer 14a. These virtual point sources (A', B', C') generate spherical waves 15b that are rescattered into a viewing direction (to the right of FIG. 1) and interfere with scattered spherical waves a 15c generated by an incident light ray 15', for example. This produces reflectively scattered beams 17.

The reflectively scattered beams 17 are detected by a detector system 25 that comprises a detector 25a (such as a television camera 25a, for example) whose output is captured by a frame grabber 28. The output of the frame grabber 28 (detector system 25) is applied to a computer 29, which includes a library 30 of models corresponding to scattering patterns or interference fringe patterns comprising the reflectively scattered beams 17. The different library models correspond to different thicknesses of the outer thin film layer 14.

The interference effects occur between the sets of waves 15b, 15c, since the coherence length (L) of the incident light radiation 15 is less than the separation between respective distal surfaces of the first and outer thin film layers 13, 14. The angles of incidence and reflectance of the radiation 15 are not equal in general, and scattering losses rapidly reduce the amplitude of the multiple reflections, thus simplifying the library model used to predict the thickness of the outer layer 14, as will be discussed below. The characteristics of the scattering surface 16 are important in obtaining a sufficient fringe finesse, and a strong forward scatterer is preferred.

Figure 2:
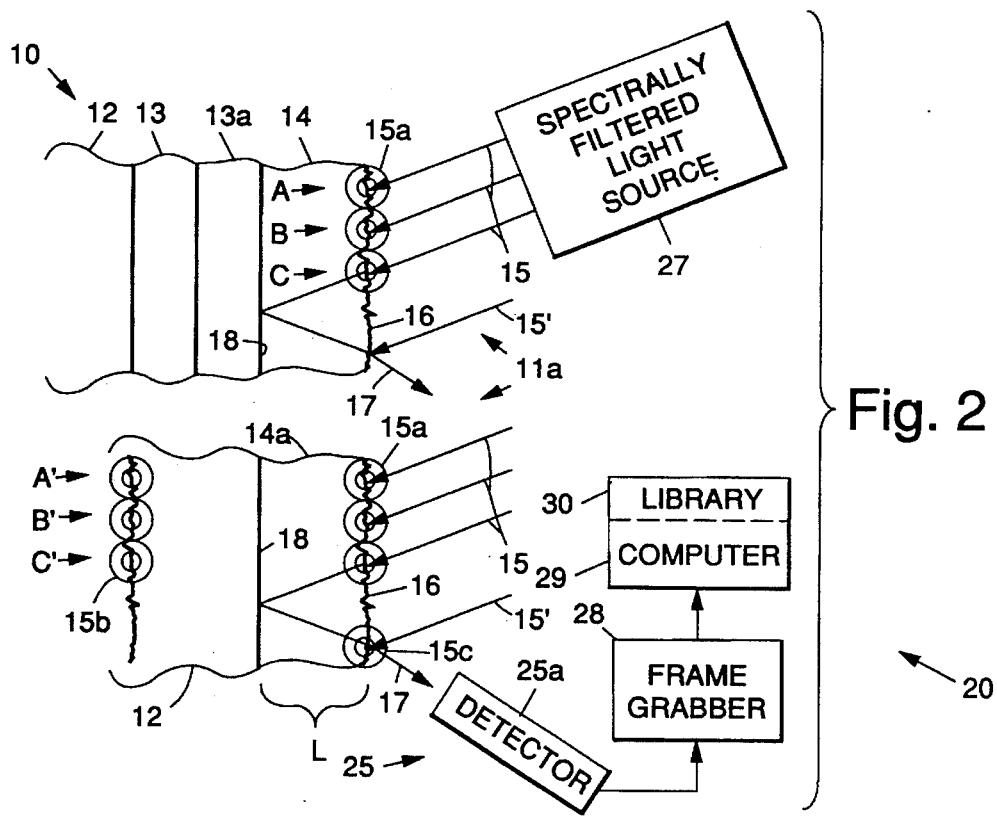
FIG. 2 shows a thickness measuring system in accordance with the principles of the present invention for measuring the thickness of a thin film structure having a separate incoherently coupled structured surface.

FIG. 2 shows the thickness measuring system 20 of FIG. 1 adapted for measuring the thickness of a thin film structure 11a comprising a substrate 12, two planar layers 13, 13a, and an outer thin film layer 14 that has a ground outer or exposed surface 16 that forms the coherent structured outer surface 16 of the wafer 10. The two planar layers 13, 13a may be combined with the outer thin film layer 14 to produce a single layer 14a that is illuminated as described above. The effects of the range of incident radiation angles may be included in the library 30 to simulate the scattering surface 16 of the outer thin film layer 14 in the manner described above.

Figure 3:
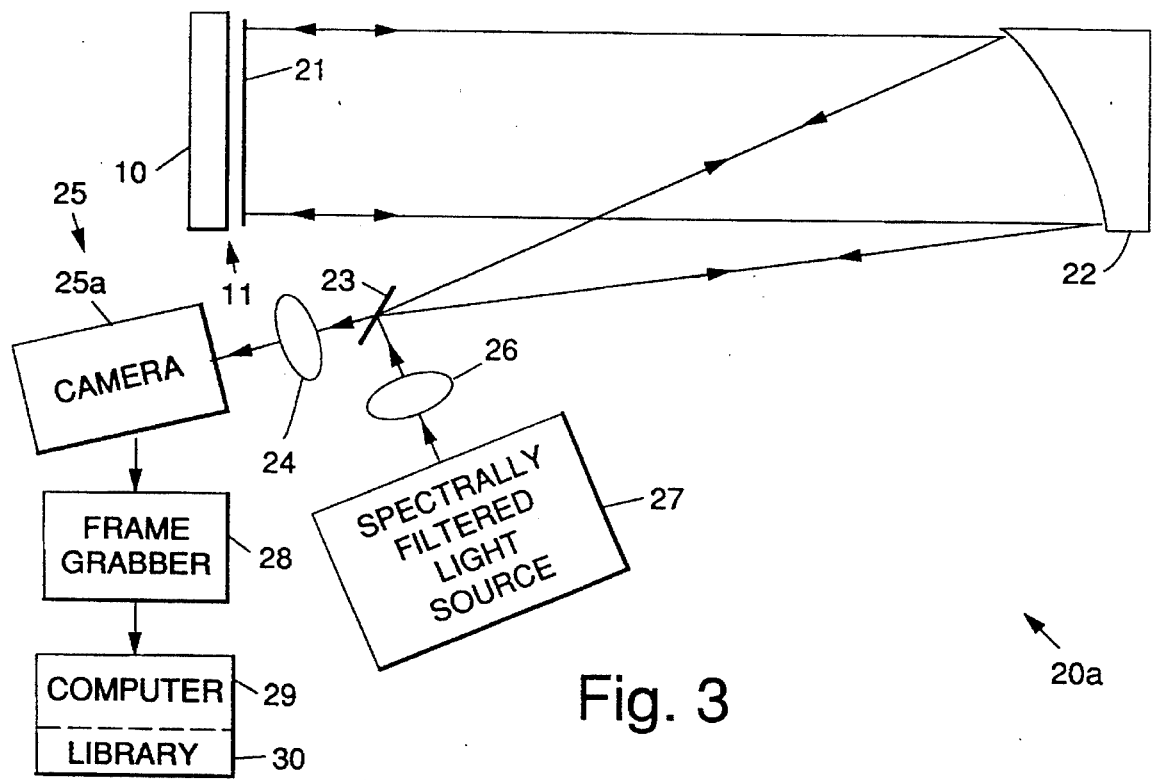
FIG. 3 shows a thickness measuring system in accordance with the principles of the present invention for measuring the film thickness of partially polished thin film structures.

FIG. 3 shows a thickness measuring system 20a in accordance with the principles of the present invention for measuring the film thickness of partially polished thin film structures 11. The thin film structure 11 has been described with reference to FIGS. 1 and 2 above. As is shown in FIG. 3, the wafer 10 has a finely ground top surface 16 and is disposed along an optical path of the system 20a. A separate structured surface 21, such as a ground glass plate, for example, is disposed close to the film structure 11 at a distance greater than the coherence length (L) for the radiation 15 used to irradiate the thin film structure 11. The thin film structure 11 is illuminated over a widely varying range of angles, but there are no interference effects in the reflectively scattered beams 17 emerging from the scattering surface 16. The resulting reflectance at any point on the wafer 10 is determined by averaging the spectral responses over the range of angles defined by the scattering surface 16 and the geometry of the viewing optical system (detector system 25) comprising the television camera 25a, for example. The determination of film thickness uses the scattering characteristics in the library 30 stored in the computer 29 to predict the spectral performance of the thin film structure 11 over a limited range.

Figure 4:
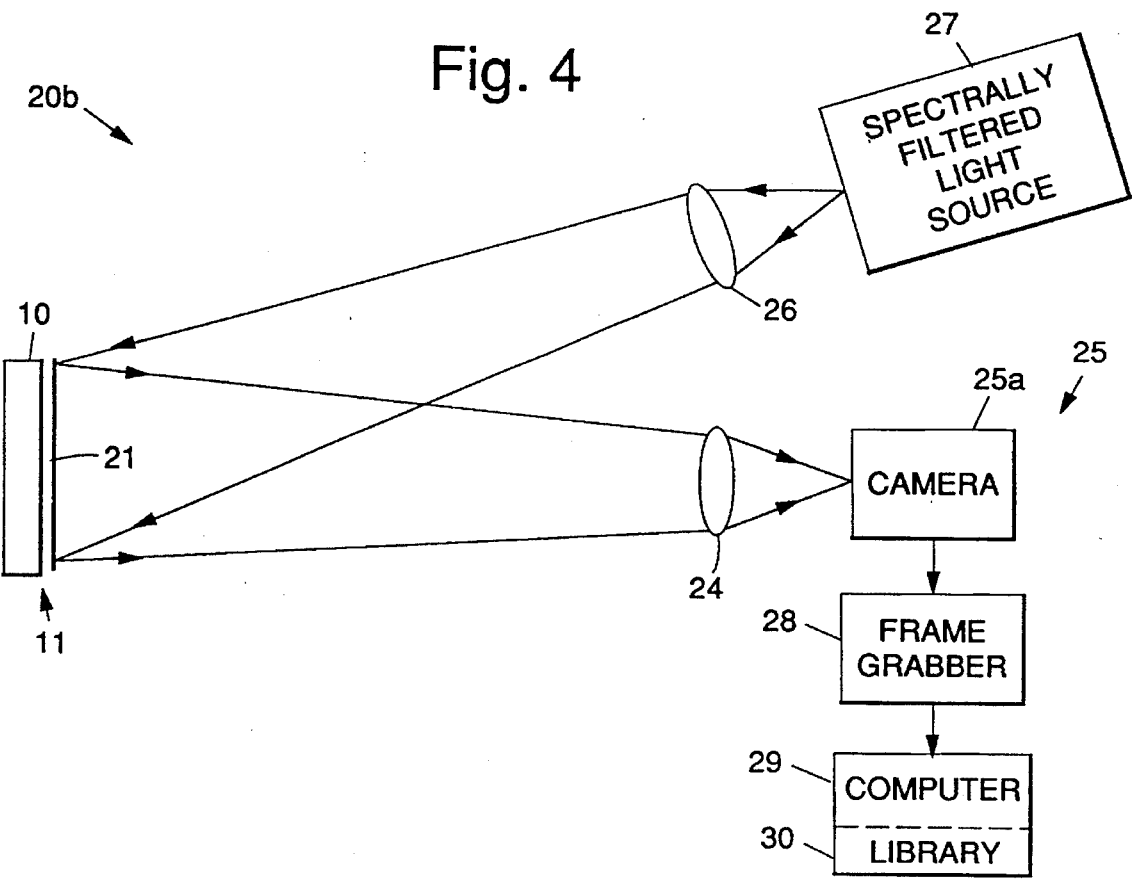
FIG. 4 shows a thickness measuring system in accordance with the principles of the present invention for measuring the film thickness of thin film structures having scattering or structured surfaces.

FIG. 4 shows a thickness measuring system 20b in accordance with the principles of the present invention for measuring the thickness of a bonded or coated wafer 10 using a separate structured surface 21. The structured surface 21 may be comprised of a ground glass plate or screen, a lens array, a grating array, or binary optics, for example. In the thickness measuring system 20b of FIG. 4, the structured surface 21 is disposed close to a wafer 10, and the wafer 10 and structured surface 21 are illuminated by a filtered light source 27 and the wafer 10 and structured surface 21 is viewed by the detector system 25, such as the television camera 25a. If the scattering characteristics of the structured surface 21 are optimized to provide a dominant forward scatter, then light loss is minimized and the signal-to-noise ratio of the measurement is improved.

Thus there has been described a new and improved film thickness measurement systems for use with structures containing a scattering surface. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A film thickness measuring system for measuring the thicknesses of a thin film structure, said system comprising:

a scattering surface on or in proximity to a surface of the thin film structure;

a spectrally filtered light source for illuminating the thin film structure to produce a reflectively scattered beam therefrom;

a detector system for detecting the reflectively scattered beam and providing an output signal corresponding thereto; and a computer coupled to the detector system that comprises a library including a plurality of models corresponding to scattering patterns from the reflectively scattered beam, and that correspond to respective thicknesses of the thin film structure.

2. The film thickness measuring system of claim 1 wherein the detector system comprises:

a detector for detecting the reflectively scattered beam and providing an output signal corresponding thereto; and a frame grabber coupled to the detector for capturing the output signal produced by the detector.

3. The film thickness measuring system of claim 1 wherein the scattering surface comprises:

an outer thin film layer that has a ground outer surface over a substrate and a first thin film layer of a wafer that forms a coherent structured outer scattering surface of the wafer.

4. The film thickness measuring system of claim 1 wherein the thin film structure comprises a partially polished thin film structure, and wherein the scattering surface comprises a structured surface disposed between the thin film structure and the spectrally filtered light source, and disposed adjacent to the thin film structure at a distance greater than the coherence length (L) for the radiation provided by the spectrally filter in light source.

5. The film thickness measuring system of claim 4 wherein the plurality of library models are determined by characterizing the structured surface as a beamsplitter.

6. The film thickness measuring system of claim 4 wherein the structured surface is selected from the group consisting of a fly's eye, lenslet arrays, binary optical elements or diffractive patterned elements.

7. The film thickness measuring system of claim 4 wherein the structured surface is selected from the group consisting of a fly's eye, lenslet arrays, binary optical elements or diffractive patterned elements.

8. The film thickness measuring system of claim 1 wherein the thin film structure comprises a bonded wafer.

9. The film thickness measuring system of claim 1 wherein the thin film structure comprises a coated wafer.

10. Apparatus comprising:

a thin film structure;

a scattering surface on or in proximity to a surface of the thin film structure;

a spectrally filtered light source for illuminating the thin film structure to produce a reflectively scattered beam therefrom;

a detector system for detecting the reflectively scattered beam and providing an output signal corresponding thereto; and a computer coupled to the detector system that comprises a library including a plurality of models corresponding to scattering patterns from the reflectively scattered beam, and that correspond to respective thicknesses of the thin film structure.

11. The film thickness measuring system of claim 10 wherein the detector system comprises:

a detector for detecting the reflectively scattered beam and providing an output signal corresponding thereto; and a frame grabber coupled to the detector for capturing the output signal produced by the detector.

12. The film thickness measuring system of claim 10 wherein the thin film structure comprises:

a multilayer thin film structure comprising a wafer that includes a substrate, a first thin film layer, and an outer thin film layer that has a ground outer surface that forms a coherent structured outer surface of the wafer.

13. The film thickness measuring system of claim 10 wherein the thin film structure comprises a partially polished thin film structure, and wherein the scattering surface comprises a structured surface disposed between the thin film structure and the spectrally filtered light source, and disposed adjacent to the thin film structure at a distance greater than the coherence length (L) for the radiation provided by the spectrally filtered light source.

14. The film thickness measuring system of claim 13 wherein the plurality of library models are determined by characterizing the structured surface as a beamsplitter.

15. The film thickness measuring system of claim 10 wherein the thin film structure comprises a bonded wafer.

16. The film thickness measuring system of claim 10 wherein the thin film structure comprises a coated wafer.

17. A method measuring the thickness of a thin film structure comprising the steps of:

providing a scattering surface on or in proximity to a surface of the thin film structure;

providing a spectrally filtered light source to illuminate the thin film structure such that a reflectively scattered beam is produced therefrom;

providing a detector system to detect the reflectively scattered beam and to provide an output signal corresponding thereto; and providing a computer coupled to the detector system that comprises a library including a plurality of models corresponding to scattering patterns from the reflectively scattered beam, and that corresponds to the respective thicknesses of the thin film structure.

18. The method of claim 17 wherein the thin film structure comprises a wafer that includes a substrate, a first thin film layer, and an outer thin film layer having a ground outer surface that forms a coherent structured outer surface of the wafer.

19. The method of claim 18 wherein the scattering surface comprises a structured surface disposed between the thin film structure and the spectrally filtered light source, and disposed adjacent to the thin film structure at a distance greater than the coherence length for the radiation provided by the spectrally filtered light source.

20. The method of claim 19 wherein the plurality of library models are determined by characterizing the structured surface as a beamsplitter.

21. The method of claim 19 wherein the structured surface is selected from the group consisting of a fish's eye, lenslet arrays, binary optical elements or diffractive patterned elements.

* * * * *